(12) United States Patent
Morimoto

(10) Patent No.: US 10,968,339 B2
(45) Date of Patent: Apr. 6, 2021

(54) ANTIOXIDANT-CONTAINING FOAMABLE RESIN PARTICLES, METHOD FOR PRODUCING SAME, FOAMABLE PARTICLES, AND FOAM-MOLDED ARTICLE

(71) Applicant: SEKISUI PLASTICS CO., LTD., Osaka (JP)

(72) Inventor: Seiichi Morimoto, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 109 days.

(21) Appl. No.: 16/088,245

(22) PCT Filed: Sep. 27, 2016

(86) PCT No.: PCT/JP2016/078467
§ 371 (c)(1),
(2) Date: Sep. 25, 2018

(87) PCT Pub. No.: WO2017/168792
PCT Pub. Date: Oct. 5, 2017

(65) Prior Publication Data
US 2019/0085160 A1    Mar. 21, 2019

(30) Foreign Application Priority Data
Mar. 30, 2016 (JP) .............. JP2016-069521

(51) Int. Cl.
| | | |
|---|---|---|
| *C08J 9/00* | (2006.01) | |
| *C08J 9/18* | (2006.01) | |
| *C08L 25/06* | (2006.01) | |
| *C08L 23/10* | (2006.01) | |
| *C08F 255/02* | (2006.01) | |
| *C08K 5/00* | (2006.01) | |
| *C08L 23/12* | (2006.01) | |
| *C08J 9/22* | (2006.01) | |
| *C08J 9/14* | (2006.01) | |
| *C08F 2/18* | (2006.01) | |

(52) U.S. Cl.
CPC ............ *C08L 25/06* (2013.01); *C08F 255/02* (2013.01); *C08J 9/0061* (2013.01); *C08J 9/18* (2013.01); *C08K 5/00* (2013.01); *C08L 23/10* (2013.01); *C08L 23/12* (2013.01); *C08F 2/18* (2013.01); *C08J 9/0019* (2013.01); *C08J 9/0023* (2013.01); *C08J 9/141* (2013.01); *C08J 9/22* (2013.01); *C08J 2203/22* (2013.01); *C08J 2323/12* (2013.01); *C08J 2325/06* (2013.01); *C08J 2423/12* (2013.01); *C08J 2425/06* (2013.01); *C08L 2201/02* (2013.01); *C08L 2201/08* (2013.01); *C08L 2203/14* (2013.01); *C08L 2207/53* (2013.01)

(58) Field of Classification Search
CPC ......... C08F 255/02; C08F 2/18; C08J 9/0061; C08J 9/18; C08J 2203/22; C08J 2323/12; C08J 2325/06; C08J 2423/12; C08J 2425/06; C08J 9/0019; C08J 9/0023; C08J 9/141; C08J 9/22; C08K 5/00; C08L 23/10; C08L 23/12; C08L 25/06; C08L 2201/02; C08L 2201/08; C08L 2203/14; C08L 2207/53
See application file for complete search history.

(56) References Cited

U.S. PATENT DOCUMENTS

| | | |
|---|---|---|
| 4,855,327 A | 8/1989 | Fukui |
| 5,670,102 A | 9/1997 | Perman et al. |
| 2010/0022674 A1 | 1/2010 | Morioka et al. |
| 2010/0063170 A1 | 3/2010 | Ishida et al. |
| 2011/0281963 A1 | 11/2011 | Yoshida et al. |
| 2012/0021238 A1 | 1/2012 | Krupinski et al. |

FOREIGN PATENT DOCUMENTS

| | | |
|---|---|---|
| JP | 55-78029 A | 6/1980 |
| JP | 1-156339 A | 6/1989 |
| JP | 6-322168 A | 11/1994 |
| JP | 2008-075076 A | 4/2008 |
| JP | 2008-133449 A | 6/2008 |
| JP | 2008-239794 A | 10/2008 |
| JP | 2009-256470 A | 11/2009 |
| JP | 2010-222546 A | 10/2010 |
| JP | 2011-202108 A | 10/2011 |
| WO | 2010/087111 A1 | 8/2010 |

OTHER PUBLICATIONS

International Search Report for PCT/JP2016/078467, dated Dec. 13, 2016.
International Preliminary Report on Patentability for PCT/JP2016/078467, dated Oct. 2, 2018.
Supplementary European Search Report, European Patent Office, Application No. 16897009.3, dated Sep. 18, 2019, 6 pages.

*Primary Examiner* — Irina S Zemel
(74) *Attorney, Agent, or Firm* — Greenblum & Bernstein, P.L.C.

(57) ABSTRACT

Antioxidant-containing expandable resin particles including composite resin particles containing 100 to 400 parts by mass of polystyrene-based resin relative to 100 parts by mass of polypropylene-based resin, and a blowing agent and an antioxidant contained in the composite resin particles, wherein the polypropylene-based resin is abundantly present on the surface of the composite resin particles and poorly present at the center of the particles, and the composite resin particles contain 150 to 1500 ppm of antioxidant.

9 Claims, No Drawings

US 10,968,339 B2

ANTIOXIDANT-CONTAINING FOAMABLE RESIN PARTICLES, METHOD FOR PRODUCING SAME, FOAMABLE PARTICLES, AND FOAM-MOLDED ARTICLE

TECHNICAL FIELD

The present invention relates to antioxidant-containing foamable resin particles (antioxidant-containing expandable resin particles) and a method for producing the same, expanded particles obtained thereby and an expanded molded article. More specifically, the present invention relates to antioxidant-containing expandable resin particles that contain a necessary and necessary and sufficient amount for antioxidation of antioxidant and can provide an expanded molded article exhibiting sufficient and excellent resistance to thermal deterioration and a production method thereof, expanded particles obtained therefrom and an expanded molded article.

BACKGROUND ART

Expanded molded articles made of polystyrene-based resins have excellent shock absorbing property and heat insulating property and are easily molded, and thus are often used for packaging materials and heat insulating materials. However, due to insufficient impact resistance and flexibility, cracking and chipping are likely to occur, and thus the expanded molded articles are not suitable for packaging, for example, precision instrument products.

Meanwhile, expanded molded articles made of polyolefin-based resins have excellent chemical resistance, impact resistance and flexibility. However, polyolefin-based resins have less ability to retain blowing gas, and thus precise control of expansion and molding conditions is required, which causes an issue of increased production cost. In addition, there is another issue in that rigidity is inferior to polystyrene-based resin expanded molded articles.

Thus, various styrene-modified polyolefin-based resin particles (also referred to as "composite resin particles" or "modified resin particles") having combined characteristics of two different resins and expanded molded articles obtained therefrom have been proposed (for example, see Japanese Unexamined Patent Application Publication No. 2008-075076 (Patent Document 1) and Japanese Unexamined Patent Application Publication No. 2008-239794 (Patent Document 2)).

Japanese Unexamined Patent Application Publication No. 2010-222546 (Patent Document 3) and Japanese Unexamined Patent Application Publication No. 2011-202108 (Patent Document 4) respectively disclose that composite resin particles may contain antioxidants.

Further, Japanese Unexamined Patent Application Publication No. 2008-133449 (Patent Document 5) discloses conducting melt extrusion of a polyolefin-based resin in the presence of 0.005 to 0.5 parts by mass of radical scavenger (phenol-based antioxidant). It is calculated that the composite resin particles disclosed therein contain about 7 to 2100 ppm radical scavenger. However, because of consumption (decomposition) of antioxidants due to heating during the production process, the residual amount may be lower.

CITATION LIST

Patent Literatures

Patent Document 1: Japanese Unexamined Patent Application Publication No. 2008-075076
Patent Document 2: Japanese Unexamined Patent Application Publication No. 2008-239794
Patent Document 3: Japanese Unexamined Patent Application Publication No. 2010-222546
Patent Document 4: Japanese Unexamined Patent Application Publication No. 2011-202108
Patent Document 5: Japanese Unexamined Patent Application Publication No. 2008-133449

SUMMARY OF INVENTION

Technical Problems

In order to add an antioxidant to composite resin particles, a polyolefin-based resin and an antioxidant are generally mixed and kneaded on an extruder, and obtained polyolefin-based resin is used as seed particles to perform seeded polymerization of a styrene monomer.

However, the method has such an issue that sufficient amount of antioxidant may not be added because of inhibition of the polymerization initiator used for seeded polymerization by the antioxidant, causing an adverse effect on polymerization reaction such as blocking (coagulation).

Moreover, because of consumption (decomposition) of antioxidant due to high-temperature heating during the production process, it is also difficult to retain an antioxidant in composite resin particles at a high ratio.

Among polyolefin-based resins that form composite resins, polypropylene-based resins are liable to be deteriorated by oxidation compared to polyethylene-based resins and ethylene-vinyl acetate copolymer resins. Therefore, the above issues are deep particularly for composite resins containing polypropylene-based resins.

Thus, an object of the present invention is to provide antioxidant-containing expandable resin particles that contain a necessary and sufficient amount of antioxidant and can provide an expanded molded article exhibiting sufficient and excellent resistance to thermal deterioration and a production method thereof, expanded particles obtained therefrom and an expanded molded article.

Solution to Problems

The inventors of the present invention carried out extensive study in order to achieve the above object and, as a result, found that antioxidant-containing expandable resin particles that contain a necessary and sufficient amount of antioxidant and can provide an expanded molded article exhibiting sufficient and excellent resistance to thermal deterioration can be obtained by adding an antioxidant to composite resin particles obtained by seeded polymerization in the step of obtaining flame retardant-containing composite resin particles by impregnating the composite resin particles with a flame retardant or in the step of obtaining expandable composite resin particles by impregnating the composite resin particles with a blowing agent. Thereby, the inventors completed the present invention.

The present invention thus provides antioxidant-containing expandable resin particles comprising composite resin particles containing 100 to 400 parts by mass of polystyrene-based resin relative to 100 parts by mass of polypropylene-based resin, and a blowing agent and an antioxidant contained in the composite resin particles, wherein:

the polypropylene-based resin is abundantly present on the surface of the composite resin particles and poorly present at the center of the particles; and the composite resin particles contain 150 to 1500 ppm of antioxidant.

The present invention also provides a method for producing the antioxidant-containing expandable resin particles, comprising the step of impregnating the composite resin particles with an antioxidant together with a flame retardant or a blowing agent.

The present invention further provides expanded particles obtained by expanding the antioxidant-containing expandable resin particles, the expanded particles containing 100 to 1500 ppm of antioxidant.

The present invention further provides an expanded molded article obtained by expansion-molding the expanded particles, the expanded molded article containing 100 to 1500 ppm of antioxidant.

Advantageous Effects of Invention

The present invention can provide antioxidant-containing expandable resin particles that contain a necessary and sufficient amount of antioxidant and can provide an expanded molded article exhibiting sufficient and excellent resistance to thermal deterioration and a production method thereof, expanded particles obtained therefrom and an expanded molded article.

The antioxidant-containing expandable resin particles of the present invention exhibits the above effect more strongly when any one of the following conditions is fulfilled:
(1) a content of the polystyrene-based resin relative to 100 parts by mass of the polypropylene-based resin is 150 to 300 parts by mass;
(2) the polypropylene-based resin is present on the surface of the composite resin particles at 51 to 85% and the polystyrene-based resin is present on the surface of the composite resin particles at 15 to 49%; and
(3) the composite resin particles contain 200 to 1400 ppm of antioxidant.

The method for producing the antioxidant-containing expandable resin particles of the present invention exhibits the above effect more strongly when any one of the following conditions is fulfilled:
(4) the method comprises a polymerization step of obtaining composite resin particles by repeating, at least twice, the step of impregnating seed particles of the polypropylene-based resin with a monomer for the polystyrene-based resin and polymerizing the same, wherein the polymerization step has a polymerization temperature for a first polymerization of $(T-10)°$ C. to $(T+20)°$ C. and for a second polymerization of $(T-25)°$ C. to $(T+10)°$ C., provided that T° C. is a melting point of the polypropylene-based resin; and
(5) the flame retardant and the antioxidant are added to an aqueous medium containing the composite resin particles dispersed therein, and the composite resin particles are impregnated with the flame retardant and the antioxidant while maintaining the mixture at 120 to 150° C. for 1 to 3 hours.

DESCRIPTION OF EMBODIMENTS (1) Antioxidant-Containing Expandable Resin Particles The antioxidant-containing expandable resin particles (hereinafter also referred to as "expandable resin particles") of the present invention comprise composite resin particles containing 100 to 400 parts by mass of polystyrene-based resin relative to 100 parts by mass of polypropylene-based resin, and a blowing agent and an antioxidant contained in the composite resin particles, wherein:

the polypropylene-based resin is abundantly present on the surface of the composite resin particles and poorly present at the center thereof; and the composite resin particles contain 150 to 1500 ppm of antioxidant.

[Polypropylene-Based Resin: PP]

As the polypropylene-based resin used in the present invention, resins obtained by well-known polymerization methods may be mentioned which may be crosslinked and may contain a component selected from a polyethylene resin and an ethylene-acrylate copolymer resin in view of impact resistance. Examples thereof include propylene, ethylene-propylene random copolymers, propylene-1-butene copolymers, ethylene-propylene-butene random copolymers and the like and specific examples include the commercially available products used in Examples.

In the present invention, the polypropylene-based resins described above may be used alone or by combining two or more thereof.

The polypropylene-based resin has a mass average molecular weight (Mw) of about 100,000 to 700,000.

[Polystyrene-Based Resin: PS]

There are no particular limitations as the polystyrene-based resin used in the present invention as far as the resin contains a styrene-based monomer used in the art as a main component and does not inhibit the effect of the present invention. As the polystyrene-based resin, homopolymers and copolymers of styrene or styrene derivatives may be mentioned.

As styrene derivatives, α-methylstyrene, vinyl toluene, chlorostyrene, ethylstyrene, isopropylstyrene, dimethylstyrene, bromostyrene and the like may be mentioned.

The polystyrene-based resin may be a resin that is combined with a vinyl-based monomer copolymerizable with a styrene-based monomer.

As vinyl-based monomers, for example, multifunctional monomers such as divinylbenzenes such as o-divinylbenzene, m-divinylbenzene, and p-divinylbenzene, and alkylene glycol di(meth)acrylates such as ethylene glycol di(meth)acrylate and polyethylene glycol di(meth)acrylate; (meth)acrylonitrile; methyl (meth)acrylate; butyl (meth)acrylate; and the like may be mentioned. Among these, multifunctional monomers are preferable, ethylene glycol di(meth)acrylate, polyethylene glycol di(meth)acrylates in which the number of ethylene units is 4 to 16, and divinylbenzenes are more preferable, and divinylbenzenes and ethylene glycol di(meth)acrylate are particularly preferable.

Also, when monomers are combined, it is preferable that the content thereof is set so that the styrene-based monomer is an amount so as to become the main component (for example, 50% by mass or more).

As used herein, "(meth)acrylic" means "acrylic" or "methacrylic".

The polystyrene-based resin above may be used alone or by combining two or more thereof.

The polystyrene-based resin has a mass average molecular weight (Mw) of about 100,000 to 400,000.

[Ratio Between Polypropylene-Based Resin and Polystyrene-Based Resin]

The composite resin particles contain 100 to 400 parts by mass of the polystyrene-based resin relative to 100 parts by mass of the polypropylene-based resin.

When the polystyrene-based resin is less than 100 parts by mass relative to 100 parts by mass of the polypropylene-based resin, the expanded molded article may have decreased rigidity. Meanwhile, when the polystyrene-based resin is above 400 parts by mass relative to 100 parts by mass of the polypropylene-based resin, the expanded molded article may have decreased chemical resistance and thermal resistance.

Examples of the content (parts by mass) of the polystyrene-based resin relative to 100 parts by mass of the polyolefin-based resin include 100, 110, 120, 130, 140, 150, 160, 170, 180, 190, 200, 210, 220, 230, 240, 250, 260, 270, 280, 290, 300, 310, 320, 330, 340, 350, 360, 370, 380, 390 and 400.

The content of the polystyrene-based resin relative to 100 parts by mass of the polypropylene-based resin is preferably 150 to 300 parts by mass.

[Distribution of Polypropylene-Based Resin]

In the expandable resin particles of the present invention, the polypropylene-based resin is abundantly present on the surface of the composite resin particles and poorly present at the center of the particles.

Such a gradient structure of the resin component results from the seeded polymerization described hereinbelow, and the structure may be confirmed by the absorbance obtained by the surface analysis according to the infrared spectroscopic analysis.

Thus, the surface of the composite resin particle as used herein means the region from the surface of the composite particles to the depth of several micrometers that can be analyzed by surface analysis according to the infrared spectroscopic analysis.

For example, the polypropylene-based resin is present on the surface of the composite resin particles at about 51 to 85%. Meanwhile, the polystyrene-based resin is present on the surface of the composite resin particles at about 15 to 49%.

Preferably, the polypropylene-based resin is present on the surface of the composite resin particle at about 51 to 70% and the polystyrene-based resin is present on the surface of the composite resin particles at about 30 to 49%.

The analysis method thereof is described in Examples.

[Antioxidant]

The antioxidant used in the present invention is not particularly limited as far as the antioxidant is one used in the art and does not inhibit the effect of the present invention.

Examples of such an antioxidant include phenol-based antioxidants, amine-based antioxidant, phosphorus-based antioxidants, sulfur-based antioxidants, hydrazine-based antioxidants and amide-based antioxidants.

In the present invention, the antioxidants described above may be used alone or may be combined.

A method for impregnating the composite resin particles with the antioxidant is described in the next section of (2) production method.

[Content of Antioxidant]

The expandable resin particles of the present invention contain 150 to 1500 ppm of antioxidant in the composite resin particles.

When the content of the antioxidant is less than 150 ppm in the composite resin particles, the expanded molded article may not exhibit resistance to thermal deterioration. Meanwhile, when the content of the antioxidant is above 1500 ppm in the composite resin particles, excess antioxidant content may increase the production cost.

Examples of the content (ppm) of the antioxidant in the expandable resin particles include 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 and 1500.

The content of the antioxidant is preferably 200 to 1400 ppm and more preferably 200 to 1300 ppm.

The method for determining the content of the antioxidant is described in Examples.

[Blowing Agent]

The blowing agent used in the present invention is preferably a volatile blowing agent, which is not particularly limited as far as the blowing agent has been conventionally used in the expansion of polystyrene-based resins. For example, volatile blowing agents such as aliphatic hydrocarbons having 5 or less carbons such as isobutane, n-butane, isopentane, n-pentane and neopentane may be mentioned. In particular, butane-based blowing agents and pentane-based blowing agents are preferable. It can be also expected that pentane will act as a plasticizer.

[Content of Blowing Agent]

The content of the blowing agent in the expandable resin particles is normally in the range of 2 to 18% by mass, preferably in the range of 3 to 10% by mass and particularly preferably in the range of 3 to 8% by mass.

When the content of the blowing agent is low, for example, less than 2% by mass, obtaining a low-density expanded molded article from the expandable resin particles may not be possible and since an effect of increasing the secondary expansion force during expansion molding in the cavity also cannot be achieved, the appearance of the expanded molded article may deteriorate. Meanwhile, when the content of the blowing agent is high, for example, exceeds 18% by mass, the time required for the cooling step in the production process of an expanded molded article using the expandable resin particles increases, and thus productivity may deteriorate.

A method for impregnating the composite resin particles with the blowing agent is described in the next section of (2) production method.

(Blowing Auxiliary Agent)

The expandable resin particles may contain, in addition to the blowing agent, a blowing auxiliary agent.

The blowing auxiliary agent is not particularly limited as far as the blowing auxiliary agent has been conventionally used for expansion of polystyrene-based resins. For example, aromatic organic compounds such as styrene, toluene, ethylbenzene and xylene; cyclic aliphatic hydrocarbons such as cyclohexane and methylcyclohexane; and solvents that have a boiling point of 200° C. or less at 1 atm such as ethyl acetate and butyl acetate may be mentioned.

The content of the blowing auxiliary agent in the expandable resin particles is normally in the range of 0.3 to 2.5% by mass and preferably in the range of 0.5 to 2% by mass.

When the content of the blowing auxiliary agent is low, for example, less than 0.3% by mass, the plasticization effect of the polystyrene-based resin may not be exhibited. Meanwhile, when the content of the blowing auxiliary agent is high, for example, exceeds 2.5% by mass, the appearance may deteriorate by the occurrence of shrinkage and melting in the expanded molded article obtained by expanding the expandable resin particles or the time required for the cooling step in the production process of the expanded molded article using the expandable resin particles may increase.

[Mass Average Molecular Weight Mw of Composite Resin Particles]

The composite resin particles of the present invention preferably have a mass average molecular weight Mw in terms of polystyrene of 100,000 to 400,000.

When the composite resin particles have a mass average molecular weight Mw in terms of polystyrene in the above range, the obtained expanded molded article has increased thermal resistance and is expected to have excellent expandability.

When the composite resin particles have a mass average molecular weight Mw in terms of polystyrene of less than 100,000, the obtained expandable resin particles do not have a melt tension that is suitable for expansion and the obtained expanded molded article may have decreased thermal resistance as well as decreased expandability. Meanwhile, when the composite resin particles have a mass average molecular weight Mw in terms of polystyrene of above 400,000, the obtained expandable resin particles may have decreased expandability.

Examples of the mass average molecular weight Mw in terms of polystyrene of the composite resin particles include 100,000, 150,000, 200,000, 250,000, 300,000, 350,000 and 400,000.

The composite resin particles more preferably have a mass average molecular weight Mw in terms of polystyrene of 150,000 to 350,000.

(2) Production Method of Antioxidant-Containing Expandable Resin Particles

The production method of the expandable resin particles of the present invention is characterized in that the method comprises the step of impregnating composite resin particles with an antioxidant together with a flame retardant or a blowing agent.

According to the production method of the present invention, decomposition of the antioxidant due to high-temperature heating in the extrusion step and the polymerization step may be suppressed, and thus the resistance to thermal deterioration of final products (expanded molded articles) may be retained.

The above method is seeded polymerization. Generally, by polymerizing a monomer while or after the monomer is absorbed in seed particles, composite resin particles may be obtained. Alternatively, expandable resin particles may be obtained by impregnating composite resin particles with a blowing agent after or during polymerization.

In the seeded polymerization, a polymerization step of impregnating seed particles made of a polypropylene-based resin with a monomer (also referred to as "styrene monomer") of a styrene-based resin and polymerizing the same may be repeated at least twice.

By repeating the polymerization step twice or more, spherical composite resin particles may be obtained and polymerization of the monomer of the styrene-based resin impregnated in seed particles made of the polypropylene-based resin tends to proceed.

In the seeded polymerization, the hydrophobic styrene monomer avoids an aqueous medium to be impregnated and polymerized at the central part of seed particles made of the polypropylene-based resin, and polymerization proceeds while the styrene monomer is gradually absorbed. Therefore, with production of the polystyrene-based resin, the seed particles grow into bigger particles in which the polystyrene-based resin is increased as approaching the central part.

Meanwhile, at the vicinity of the surface, the polypropylene-based resin is contained at a high ratio and the polystyrene-based resin is finely dispersed in polypropylene-based resin while gradually reducing the ratio and the size of the polystyrene-based resin as approaching the surface of the particles. Thus, at the surface of the particles, the polystyrene-based resin is present at a lower ratio and the polypropylene-based resin is present at a higher ratio.

As a result, in the composite resin particles and the expandable resin particles containing a blowing agent that are ultimately obtained, the polypropylene-based resin is present abundantly on the surface thereof and poorly in the center of the particles.

[First Polymerization Step]

In an aqueous medium containing a dispersant, seed particles made of the polypropylene-based resin are dispersed, the seed particles are allowed to absorb a monomer of the styrene-based resin and then the temperature is increased to allow polymerization of the monomer of the styrene-based resin.

The step of polymerizing the styrene-based monomer impregnated in the polypropylene-based resin particles may be divided into two stages of first polymerization and second polymerization.

This is because when it is sought to impregnate the polypropylene-based resin with a high amount of the styrene-based monomer at one time, a sufficient amount of the styrene-based monomer may not be impregnated in the polypropylene-based resin and the styrene-based monomer remains on the surface of the polypropylene-based resin.

The polymerization temperature is an important factor, and it is preferable that the polymerization temperature is in the range of $(T-10)°$ C. to $(T+20)°$ C. in the first polymerization and $(T-25)°$ C. to $(T+10)°$ C. in the second polymerization provided that $T°$ C. is a melting point of the polypropylene-based resin.

By conducting polymerization in the above temperature range, the polystyrene-based resin is abundant in the central part of the resin particles (namely, the polypropylene-based resin is abundant in the surface layer), and as a result, it is possible to get merits of both polypropylene-based resin and polystyrene-based resin.

When the polymerization temperature is below the above temperature range, the polystyrene-based resin is poor in the central part of the obtained resin particles and thus resin particles and an expanded molded article exhibiting preferable properties may not be obtained. When the polymerization temperature is above the temperature range above, polymerization may begin before sufficient impregnation of the polypropylene-based resin particles with the styrene-based monomer, and thus resin particles and an expanded molded article exhibiting preferable properties may not be obtained.

Thus, by dividing the polymerization step into two stages of first polymerization and second polymerization, the polypropylene-based resin may be securely impregnated with the styrene-based monomer to the central part thereof in first polymerization and the polypropylene-based resin may be impregnated with the styrene-based monomer approaching the central part of the resin also in the second polymerization.

(Seed Particles)

Seed particles may be obtained by, for example, a production method including:

(a) the step a of melt-kneading a resin composition including at least the polypropylene-based resin in a kneader at a predetermined temperature to obtain a molten kneaded material having a flowability;

(b) the step b of extruding the molten kneaded material from a mold provided at an end of the kneader at a melt-kneading temperature of 230 to 280° C. to obtain an extruded material; and (c) the step c of cooling the extruded material under flowing water at a water temperature of 50 to 70° C. and cutting the same according to underwater cutting.

A mold (die) for obtaining seed particles having a predetermined size preferably has a diameter of a resin discharge hole of 0.2 to 1.0 mm and a land length of a resin channel of 2.0 to 6.0 mm, and it is preferable that the resin temperature at a die inlet of the resin extruded from an extruder is adjusted to 230 to 330° C.

By combining the extruder having a screw structure, dies, extrusion conditions and underwater cutting conditions, desired seed particles may be obtained.

The seed particles may contain an additive such as a compatibilizer of polypropylene-based resins, a cell regulator and an antistatic agent, as far as the effect of the present invention does not deteriorate.

The particle diameter of the seed particles may be appropriately adjusted according to the average particle diameter of the composite resin particles and the like, and the particle diameter is preferably in the range of 0.4 to 1.5 mm, more preferably in the range of 0.4 to 1.0 mm. The average mass of the seed particles is 30 to 90 mg/100 particles. The shape of the seed particles include sphere, ellipsoid (oval), circular cylinder, rectangular cylinder and the like.

(Aqueous Medium)

As the aqueous medium, water, and a mixed medium of water and a water-soluble medium (for example, a lower alcohol such as methyl alcohol or ethyl alcohol) may be mentioned.

(Dispersant)

The aqueous medium may contain a dispersant in order to stabilize droplets of the styrene-based monomer and dispersibility of the seed particles. As such dispersant, for example, organic dispersants such as partially saponified polyvinyl alcohol, polyacrylate salts, polyvinyl pyrrolidone, carboxymethyl cellulose and methyl cellulose; and inorganic dispersants such as magnesium pyrophosphate, calcium pyrophosphate, calcium phosphate, calcium carbonate, magnesium phosphate, magnesium carbonate and magnesium oxide may be mentioned. Among these, inorganic dispersants are preferable since it is possible to maintain a more stable dispersed state.

In the case of using an inorganic dispersant, it is preferable to use in combination with a surfactant. As such surfactant, for example, sodium dodecyl benzenesulfonate, sodium α-olefinsulfonate and the like may be mentioned.

(Polymerization Initiator)

The styrene-based monomer is generally polymerized in the presence of a polymerization initiator. The seed particles are generally impregnated with the polymerization initiator at the same time as the styrene-based monomer.

The polymerization initiator is not particularly limited as long as it has been conventionally used in the polymerization of styrene-based monomers. For example, organic peroxides such as benzoyl peroxide, t-butylperoxy benzoate, t-butylperoxy pivalate, t-butylperoxy-2-ethylhexyl monocarbonate, t-butylperoxy isopropyl carbonate, t-butylperoxyacetate, 2,2-t-butylperoxybutane, t-butylperoxy-3,3,5-trimethyl hexanoate, di-t-butylperoxy hexahydroterephthalate, 2,5-dimethyl-2,5-bis(benzoylperoxy) hexane, and dicumyl peroxide may be mentioned. These polymerization initiators may be used alone or by combining two or more thereof. The used amount of polymerization initiator is, for example, in the range of from 0.1 to 5 parts by mass relative to 100 parts by mass of the styrene-based monomer.

In order for the polymerization initiator to be uniformly absorbed into the seed particles or the particles growing from the seed particles, when adding the polymerization initiator to the aqueous medium, the polymerization initiator is preferably added to an aqueous medium after dissolving the polymerization initiator in the styrene-based monomer in advance.

The amount of the polymerization initiator added is 0.1 to 0.9 parts by mass per 100 parts by mass of the styrene-based monomer.

When the amount of the polymerization initiator added is less than 0.1 parts by mass, the molecular weight may be too high and expandability may decrease. Meanwhile, when the amount of the polymerization initiator added is above 0.9 parts by mass, the polymerization rate may be too high to control the dispersion status of the polystyrene-based resin particles in the polypropylene-based resin. The amount of the polymerization initiator added is preferably 0.2 to 0.5 parts by mass.

(Other Components)

The composite resin particles may contain an additive such as a flame retardant, a flame retardant auxiliary agent, a coloring agent, a plasticizer, a binding inhibitor, a cell regulator, a crosslinking agent, a filler, a lubricant, a fusion accelerator, an antistatic agent and a spreader in the range that does not deteriorate the properties.

As flame retardants, tris(2,3-dibromopropyl) isocyanurate, bis[3,5-dibromo-4-(2,3-dibromopropoxy) phenyl] sulfone, tetrabromocyclooctane, hexabromocyclododecane, trisdibromopropylphosphate, tetrabromobisphenol A, tetrabromobisphenol A-bis(2,3-dibromo-2-methylpropyl ether), tetrabromobisphenol A-bis(2,3-dibromopropyl ether) and the like may be mentioned.

As flame retardant auxiliary agents, organic peroxides such as 2,3-dimethyl-2,3-diphenyl butane, 3,4-dimethyl-3, 4-diphenyl hexane, dicumyl peroxide, and cumene hydroperoxide may be mentioned.

The contents of the flame retardant and the flame retardant auxiliary agent in the composite resin particles are preferably 1.0 to 5.0% by mass and 0.1 to 2.0% by mass, respectively.

As coloring agents, carbon black such as furnace black, Ketchen black, channel black, thermal black, acetylene black, graphite and carbon fiber may be mentioned and the coloring agent may alternatively be a master batch added to a resin.

The content of the carbon black in the composite resin particles is preferably 1.5 to 5.0% by mass.

As plasticizers, phthalic acid esters; glycerin fatty acid esters such as glycerin diacetomonolaurate, glycerin tristearate and glycerin diacetomonostearate; adipic acid esters such as diisobutyl adipate; coconut oil; and the like may be mentioned.

The content of the plasticizer in the composite resin particles is preferably 0.1 to 3.0% by mass.

As binding inhibitors, calcium carbonate, silica, zinc stearate, aluminum hydroxide, ethylene bis-stearic acid amide, calcium phosphate tribasic, dimethyl silicone and the like may be mentioned.

As cell regulators, ethylene bis-stearic acid amide, polyethylene wax and the like may be mentioned.

As crosslinking agents, organic peroxides such as 2,2-di-t-butyl peroxybutane, 2,2-bis(t-butylperoxy)butane, dicumyl peroxide and 2,5-dimethyl-2,5-di-t-butyl peroxyhexane may be mentioned.

As fillers, synthetic or naturally-produced silicon dioxide and the like may be mentioned.

As lubricants, paraffin wax, zinc stearate and the like may be mentioned.

As fusion accelerators, stearic acid, stearic acid triglyceride, hydroxystearic acid triglyceride, stearic acid sorbitan esterspolyethylene wax and the like may be mentioned.

As antistatic agents, polyoxyethylene alkylphenol ether, stearic acid monoglyceride, polyethylene glycol and the like may be mentioned.

As spreaders, polybutene, polyethylene glycol, silicon oil and the like may be mentioned.

[Second Polymerization Step]

Next, the monomer of the styrene-based resin is polymerized while the styrene-based monomer being absorbed.

Following the first polymerization step, the styrene-based monomer and the polymerization initiator are added and the temperature is adjusted to $(T-25)°$ C. to $(T+10)°$ C., thereby conducting impregnation of the polypropylene-based resin particles with the styrene-based monomer and second polymerization to obtain the composite resin particles.

It is preferable that the styrene-based monomer added in the second polymerization step accounts for 50 to 80% by mass of the whole monomer to be added.

[Impregnating Step with Additive]

The method for producing the expandable resin particles of the present invention comprises the step of impregnating the composite resin particles with an antioxidant together with a flame retardant. The step may be conducted according to the well-known procedure.

Specifically, to an aqueous medium after the polymerization step containing the composite resin particles dispersed therein, a flame retardant, and optionally a flame retardant auxiliary agent and an antioxidant are added and the mixture is maintained at a predetermined temperature for a predetermined time, for example at a temperature of 120 to 150° C. for 1 to 3 hours to impregnate the composite resin particles with the additives.

(Average Particle Diameter)

The composite resin particles preferably have an average particle diameter of 0.8 to 2.5 mm.

When the composite resin particles have an average particle diameter of less than 0.8 mm, high expandability may not be obtained. Meanwhile, when the composite resin particles have an average particle diameter of above 2.5 mm, the expanded particles may have insufficient filling property during the molding process. The composite resin particles more preferably have an average particle diameter of 1.0 to 1.8 mm.

[Impregnating Step with Blowing Agent (Preparation of Expandable Resin Particles)]

The method for producing the expandable resin particles of the present invention comprises the step of impregnating the composite resin particles with an antioxidant together with a blowing agent. The step may be conducted according to the well-known procedure.

Specifically, the composite resin particles and the antioxidant are charged into a pressure-resistant airtight container, a blowing agent and optionally a blowing auxiliary agent are injected therein, the mixture is maintained at a predetermined temperature for a predetermined time, for example, at a temperature of 50 to 90° C. for 1 to 4 hours to impregnate the composite resin particles with the antioxidant together with the blowing agent.

When the temperature at which the composite resin particles are impregnated with the blowing agent is low, prolonged time is required for impregnation and the production efficiency of the expandable resin particles may decrease. When the temperature is high, the expandable resin particles may be frequently bonded together, and thus the temperature is preferably in the above range and more preferably 60 to 80° C.

The blowing agent and the blowing auxiliary agent which may be added and the amounts thereof are as described above.

(3) Expanded Particles (Also Referred to as "Pre-Expanded Particles")

The expanded particles of the present invention are obtained by pre-expanding the expandable resin particles of the present invention, for example, by pre-expanding the expandable resin particles in an airtight container to a predetermined bulk density by heating the same with introduced water vapor (steam) with a gauge pressure of 0.005 to 0.09 MPa.

The manner of pre-expansion includes batch expansion and continuous expansion into which vapor is introduced and pressure release expansion. If necessary, air may be introduced together with water vapor at the time of expansion.

(Bulk Density)

The expanded particles of the present invention preferably have a bulk density of 16 to 200 kg/m$^3$.

When the expanded particles have a bulk density of less than 16 kg/m$^3$, an expanded molded article tends to shrink to deteriorate the appearance and the mechanical strength may not be enough. Meanwhile, when the expanded particles have a bulk density of above 200 kg/m$^3$, an expanded molded article may not have an advantage of weight reduction. The expanded particles more preferably have a bulk density of 20 to 100 kg/m$^3$.

The measurement method thereof is described in Examples.

(Average Particle Diameter)

The expanded particles of the present invention preferably have an average particle diameter of 1.5 to 7.5 mm.

When the expanded particles have an average particle diameter of less than 1.5 mm, the expandability during expansion molding may be low and elongation on the surface of the molded article may be insufficient. Meanwhile, when the expanded particles have an average particle diameter of above 7.5 mm, the expanded particles may have insufficient filling property during the molding process. The expanded particles more preferably have an average particle diameter of 2.5 to 5.0 mm.

(Content of Antioxidant)

The expanded particles of the present invention contains 100 to 1500 ppm of antioxidant.

When the content of the antioxidant is less than 100 ppm, an expanded molded article may have deteriorated resistance to thermal deterioration. Meanwhile, when the content of the antioxidant is above 1500 ppm, an excess antioxidant content may increase the production cost.

Examples of the content (ppm) of the antioxidant in the expanded particles include 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 and 1500.

The content of the antioxidant is preferably 200 to 1400 ppm and more preferably 200 to 1300 ppm.

The method for determining the content of the antioxidant is described in Examples.

(4) Expanded Molded Article

The expanded molded article of the present invention is obtained by subjecting the expanded particles of the present invention to expansion molding, for example, by filling the expanded particles in a mold (cavity) of an expansion molding machine and heating the same again to expand the expanded particles to thermally fuse the expanded particles.

(Expansion Ratio)

The expanded molded article of the present invention preferably has an expansion ratio of 5 to 60. When the expanded molded article has an expansion ratio of less than 5, the weight may be increased and thus weight reduction may not be sufficient. Meanwhile, when the expanded molded article has an expansion ratio of above 60, mechanical strength may not be sufficient. The expanded molded articles preferably have an expansion ratio of 10 to 50.

The measurement method thereof is described in Examples.

(Density)

The expanded molded article of the present invention preferably has a density of 16 to 200 kg/m$^3$. When the expanded molded article has a density of less than 16 kg/m$^3$, impact resistance may be insufficient. Meanwhile, when the expanded molded article has a density of above 200 kg/m$^3$, an effect of weight reduction of the expanded molded article may be limited. The expanded molded article more preferably has a density of 20 to 100 kg/m$^3$.

The measurement method thereof is described in Examples.

(Content of Antioxidant)

The expanded molded article of the present invention contains 100 to 1500 ppm of antioxidant.

When the content of the antioxidant is less than 100 ppm, the resistance to thermal deterioration may deteriorate. Meanwhile, when the content of the antioxidant is above 1500 ppm, an increased amount of antioxidant may cause deteriorated cost competitiveness.

Examples of the content (ppm) of the antioxidant in the expanded molded article include 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 and 1500.

The content of the antioxidant is preferably 200 to 1400 ppm and more preferably 200 to 1300 ppm.

The method for determining the content of the antioxidant is described in Examples.

(Reduction of Tensile Strength)

The expanded molded article of the present invention preferably has a reduction of tensile strength under the condition of 80° C.×1000 hours of within ±25%.

A small reduction of tensile strength means excellent resistance to thermal deterioration, and it is believed that a small reduction of tensile strength results from the content of the antioxidant.

The measurement method thereof is described in Examples.

(Application)

The expanded molded article of the present invention may be applied to various applications. Examples of the application include bumper core materials, automobile interior components, automobile exterior components, electronic components, various industrial materials including glass, shock absorbing materials for food products, containers for transportation and the like. Particularly, the expanded molded article of the present invention has high thermal resistance, and thus is suitably used, among the above applications, for automobile interior components and automobile exterior component (bumper core materials) that are attached at positions particularly close to engines and radiators and are likely to be affected by outside temperature or heat of internal combustion.

The term "automobile" as used herein means a vehicle that has a power generating machinery, a steering mechanism and the like and can travel on the ground while carrying passengers thereon. The term includes a vehicle connected to a cable such as trolleybus; however, the term does not include a vehicle travelling on a rail even if it is on the ground.

EXAMPLES

The present invention is hereinafter specifically described by way of Examples and Comparative Examples. However, Examples described hereinafter merely exemplify the present invention and the present invention is not limited only to Examples hereinafter.

In Examples and Comparative Examples, obtained composite resin particles, expanded particles and expanded molded articles were evaluated as follows.

<Ratio (%) of Polypropylene-Based Resin/Polystyrene-Based Resin on the Surface of Composite Resin Particles>

The composite resin particles are subjected to surface analysis according to the ATR infrared spectroscopic analysis using a Fourier transform infrared spectrophotometer (produced by Nicolet Instrument Corporation, model: MAGNA 560), thereby determining the compositional ratio between the polypropylene-based resin and the polystyrene-based resin from the ratio of absorbances in infrared absorbance spectrum. Namely, based on the standard curve prepared with standard samples containing known polystyrene components, the compositional ratio (% by mass) of polypropylene-based resin/polystyrene-based resin is determined from the ratio of absorbances in an infrared absorbance spectrum of a composite resin particle sample.

Standard samples are obtained according to the following method.

A polypropylene-based resin and a polystyrene-based resin in total of 2 g are accurately weighed so as to obtain a compositional ratio (polypropylene-based resin PP/polystyrene-based resin PS: mass ratio) of 0/10, 1/9, 2/8, 3/7, 4/6, 5/5, 6/4, 7/3, 8/2 or 10/0 and uniformly mixed.

The obtained resin mixtures are heated and kneaded at a heating temperature of 200 to 250° C. for a kneading time of 10 minutes using a small injection molding machine (produced by CSI, Inc., model: CS-183) to form circular cylinders of a diameter of 25 mm and a height of 2 mm which serve as standard samples.

The standard curve is obtained as follows.

Using the Fourier transform infrared spectrophotometer, the standard samples are measured for the absorbance ratio and the ratios (% by mass) of the polystyrene-based resin and the absorbance ratios (D698/D1376) are plotted in the vertical axis and the horizontal axis, respectively, to obtain a graph of a standard curve.

When the ratio of absorbances (D698/D1376) is less than 2.35 and at or above 2.35 and less than 10.0, the standard curve is approximated as formulae (1) and (2), respectively, indicated below.

$$Y=-2.5119X^2+22.966X \quad (1)$$

$$Y=27.591Ln(X)+16.225 \quad (2)$$

X: absorbance ratio (D698/D1376)
Y: ratio of polystyrene resin

<Contents (ppm) of Antioxidant in Expanded Particles and Expanded Molded Articles>

The contents of antioxidant in expanded particles and expanded molded articles are determined as follows according to the type of antioxidants added (IRGANOX 1010 and IRGANOX 245).

(1) Antioxidant (IRGANOX 1010)
(1-1) Extraction Pretreatment Method

Samples of expanded particles and expanded molded articles are pulverized using a freeze pulverization device (produced by Seishin Trading Co., Ltd., model: Freezer mill 6870) under the following conditions. The obtained pulverized samples are extracted with methanol using an accelerated solvent extraction device (produced by Thermo Fisher Scientific, model: Dionex, ASE-350) under the following conditions and the obtained extraction solutions are adjusted to a constant volume of 50 mL with methanol. The obtained solutions with a constant volume are filtered through non-aqueous 0.2 µm chromatodiscs (produced by GL Sciences, Inc., model: 13N) to obtain samples (eluents) for ultra high performance liquid chromatography (UHPLC).

<Freeze Pulverization Conditions>
Pulverization container: 4 mL capacity, made of stainless steel
Liquid nitrogen precooling time: 5 min
Shaking pulverization time: 2 min
Re-cooling time: 1 min
Repeat: 5 times
Sample amount: about 0.5 g <Accelerated Solvent Extraction Conditions>
Sample amount: about 0.2 g
Extraction solvent: methanol
Extraction temperature: 90° C.
Extraction pressure: 10.5 MPa
Cell size: 34 mL
Heating-up time (resting time): 5 min (10 min)
Purge time (cycles): 90 sec (3 cycles)
Rinsing amount: 5%

(1-2) Measurement Method

The concentration of IRGANOX 1010 in the above eluents is measured with the UHPLC device and conditions indicated below and the content thereof per unit area is calculated.

Specifically, using standard peak areas obtained from the chromatogram and the standard curve prepared on an analysis data system for the UHPLC device indicated below, the concentration of IRGANOX 1010 in the extraction solutions is determined and calculated as the content per unit area according to the formula indicated below.

IRGANOX 1010 content (mg/kg)=(Measured value (mg/L))×(Methanol extraction amount (L))/(Sample weight (kg))

<UHPLC Device and Measurement Conditions>
UHPLC device: produced by Shimadzu Corporation, model: Nexera X2
Column: Kinetex 1.7 µm C18 100A (2.1 mm I.D.×50 mmL)
Column temperature: 40° C.
Pump introduction temperature: room temperature (R.T.)
Solvent: 0.05% trifluoroacetic acid (TFA)/acetonitrile=5/95
Flow rate: 0.6 mL/min
Measurement time: 3 min
Injection: 1 µL
Detector: PDA=210 nm
Analysis data system: produced by Shimadzu Corporation, work station for Shimadzu chromatography, LabSolutions <Preparation Method for Standard Solutions>

With the automatic dilution function of the autosampler on the UHPLC device, 1000-ppm standard solutions are respectively diluted 10 times and 20 times with methanol to obtain a 100-ppm standard solution and a 50-ppm standard solution. Further, the 100-ppm standard solution is diluted 5 times to obtain a 20-ppm standard solution, the 50-ppm standard solution is diluted 5 times to obtain a 10-ppm standard solution, the 20-ppm standard solution is diluted 5 times to obtain a 4-ppm standard solution, the 10-ppm standard solution is diluted 10 times to obtain a 1-ppm standard solution and the 4-ppm standard solution is diluted 10 times to obtain a 0.4-ppm standard solution.

(2) Antioxidant (IRGANOX 245)
(2-1) Extraction Pretreatment Method

In the same manner as in (1-1), samples (eluents) for ultra high performance liquid chromatography (UHPLC) for quantification analysis of the antioxidant (IRGANOX 245) are obtained.

(2-2) Measurement Method

The concentration of IRGANOX 245 in the above eluents is measured with the UHPLC device and conditions indicated below and the content thereof per unit area is calculated.

Specifically, using standard peak areas obtained from the chromatogram and the standard curve prepared on an analysis data system for the UHPLC device indicated below, the concentration of IRGANOX 245 in the extraction solutions is determined and calculated as the content per unit area according to the formula indicated below.

IRGANOX 245 content (mg/kg)=(Measured value (mg/L))×(Methanol extraction amount (L))/(Sample weight (kg))

<UHPLC Device and Measurement Conditions>
UHPLC device: produced by Shimadzu Corporation, model: Nexera X2
Column: Kinetex 1.7 µm C18 100A (2.1 mm I.D.×50 mmL)
Column temperature: 40° C.
Pump introduction temperature: room temperature (R.T.)
Solvent: 0.05% trifluoroacetic acid (TFA)/acetonitrile=30/70
Flow rate: 0.4 mL/min
Measurement time: 3 min
Injection: 1 µL
Detector: PDA=210 nm
Analysis data system: produced by Shimadzu Corporation, work station for Shimadzu chromatography, LabSolutions <Preparation Method for Standard Solutions>

With the automatic dilution function of the autosampler on the UHPLC device, 10-ppm standard solutions are diluted 5 times and 20 times with methanol to obtain a 2-ppm standard solution and a 0.5-ppm standard solution, respectively. Further, the 0.5-ppm standard solution is diluted 5 times to obtain a 0.1-ppm standard solution.

<Density ($kg/m^3$) of Expanded Molded Article>

From an expanded molded article dried at 50° C. for 4 hours or more after molding, a test specimen of 75 mm long×300 mm wide×35 mm thick is excised, the mass a (kg) and the volume b ($m^3$) thereof are measured to three significant figures or more and the density of the expanded molded article is calculated based on the formula indicated below.

$$\text{Density (kg/m}^3\text{) of expanded molded article} = a/b$$

<Expansion Ratio of Expanded Molded Article>

The expanded ratio of an expanded molded article is a figure that is 1000 times of the inverse of the density of the expanded molded article.

<Reduction (%) of Tensile Strength of Expanded Molded Article and Evaluation Thereof>

With a tensilon universal tester (produced by Orientec Inc., model: UCT-10T) and a data processing software for the universal tester (produced by Softbrain Co., Ltd., product number: UTPS-458X), the tensile strength of expanded molded article samples at the standard state and after thermal resistance test (80° C., 1000 hours) is measured according to the method below and the reduction (%) of tensile strength (MPa) after thermal resistance test based on the standard state is determined.

An expanded molded article is punched out to dumbbell-like type 4 specimens according to JIS K 7127 and 7 specimens are obtained for the tests.

Obtained specimens are conditioned in the standard atmosphere of temperature of 23° C. and relative humidity of 50% over 24 hours to obtain specimens at the standard state.

Other specimen are placed in a hot air circulating furnace and heated at a temperature of 80° C. for 1000 hours and then conditioned in the standard atmosphere of temperature of 23° C. and relative humidity of 50% over 24 hours to obtain specimens after the thermal resistance test.

The tensile strength TS (MPa) of the specimens is measured with the above tester in the standard atmosphere under conditions of the distance between clamps of 100 mm and a test speed of 500 mm/min, and the tensile strength Ts in the standard state and the tensile strength Th after the thermal resistance test are calculated from the following formula according to the method in ISO 1926:2009, and the difference thereof is determined as the reduction DR (%) of tensile strength:

$$Ts \text{ or } Th = Fm/Wt$$

TS: Tensile strength (MPa)
Fm: Maximum force (N)
W: Width (mm) of the parallel section of the punching blade
t: Thickness (mm) of the parallel section $$DR = (Th - Ts)/Ts \times 100$$

The obtained results are evaluated according to the following criteria.

Evaluation ◯: Reduction of tensile strength within ±25%
x: Reduction of tensile strength over ±25%

Example 1

(Preparation of Seed Particles)

A polypropylene-based resin (produced by Prime Polymer Co., Ltd., product name "F-744NP", melting point: 140° C., propylene unit: 96% by mass, 26.7 kg) and 3.34 kg of a master batch containing 45% by mass of furnace black (produced by Dainichiseika Color 86 Chemicals Mfg., Co., Ltd., product name "PP-RM10H381") were mixed, the obtained mixture was fed to an extruder, subjected to melt-kneading at a melt-kneading temperature of 265° C. and a flowing water temperature of 60° C., subjected to underwater cutting to obtain pellets for obtaining polypropylene-based resin particles (seed particles) containing 5% by mass of carbon black (extrusion step).

The carbon-containing polypropylene-based resin particles were adjusted to be 60 mg per 100 particles.

(First Polymerization)

To a 100-L autoclave with a stirrer, 14 kg of obtained seed particles were charged, 44 kg of aqueous medium, pure water, 1.1 kg of dispersant, magnesium pyrophosphate, 10 g of surfactant to be used together with the dispersant, sodium dodecylbenzenesulfonate, were added and stirred to suspend thereof in the aqueous medium, maintained for 10 minutes and heated to 70° C. to obtain an aqueous suspension.

To the obtained suspension, 6 kg of styrene monomer containing 12 g of polymerization initiator, dicumyl peroxide (produced by NOF Corporation), dissolved therein was added dropwise over 60 minutes. The suspension was maintained for 60 minutes after dropwise addition to allow the seed particles to absorb the styrene monomer. Thereafter, the reaction system was heated to 120° C., maintained for 1 hour, further heated to 143° C., maintained for 2 hours, thereby polymerizing the styrene monomer in the seed particles.

(Second Polymerization)

The reaction solution from (First polymerization) was adjusted to 125° C., 61 g of surfactant, sodium dodecylbenzenesunfonate, was added and then 15 kg of styrene monomer containing 65 g of polymerization initiator, dicumyl peroxide (produced by NOF Corporation), dissolved therein was added dropwise over 4 hours, thereby conducting polymerization while allowing absorption of the styrene monomer in the seed particles. After the dropwise addition, the reaction system was maintained at 125° C. for 1.5 hours, then heated to 140° C. and maintained for 3 hours to complete polymerization to obtain about 35 kg of composite resin particles.

(Impregnation with Additive)

The obtained reaction solution was adjusted to 60° C. and 1050 g of flame retardant, tris(2,3-dibromopropyl)isocyanulate (produced by Nippon Kasei Chemical Co., Ltd.), 175 g of flame retardant auxiliary agent, 2,3-dimethyl-2,3-diphenylbutane (produced by Kayaku Akzo Corporation) and 35 g of antioxidant, a phenol-based antioxidant (produced by BASF SE, product name: IRGANOX 1010, melting point: 110° C.) were added (flame retardant impregnating step), the reaction system was then heated to 140° C. and maintained for 2 hours to allow absorption of the flame retardant, the flame retardant auxiliary agent and the antioxidant.

Thereafter, the reaction system was cooled to normal temperature and discharged from the 100-L autoclave and dehydrated and dried to obtain about 35 kg of carbon-containing composite resin particles.

(Preparation of Expandable Resin Particles)

The obtained carbon-containing composite resin particles (15 kg) were charged in a pressure resistant rotary mixer having an internal capacity of 50 L and rotated, and 2.4 kg of blowing agent, butane, was injected into the pressure resistant rotary mixer (gas impregnating step). After the injection, the temperature was raised to 70° C. and stirring was continued for 4 hours. Thereafter, the temperature was cooled to normal temperature and the reaction mixture was discharged from the 50-L pressure resistant rotary mixer to obtain about 15 kg of expandable composite resin particles.

(Preparation of Expanded Particles)

The obtained expandable composite resin particles (1000 g) were then charged into a pre-expansion machine (produced by Kasahara Industry Co., Ltd., model: PSX40), heated by introducing water vapor at gauge pressure of 0.02 MPa into a vessel of the pre-expansion machine to pre-expand to a bulk expansion ratio of about 40 and obtain expanded particles.

(Preparation of Expanded Molded Article)

The obtained expanded particles were then left under normal temperature and normal pressure for 24 hours and then a cavity having an inner dimension of 300 mm×400 mm×30 mm of a mold was filled with the particles. Molding was conducted by introducing water vapor of 0.25 MPa for 40 seconds and heating, and then the mold was cooled so that the maximum surface pressure of the expanded molded article decreased to gauge pressure of 0.001 MPa, thereby obtaining the expanded molded article (expansion ratio: 39.5).

The obtained expanded molded article was used for determination of the expansion ratio, the antioxidant content and the reduction of tensile strength (80° C.×1000 hr).

The results are shown in Table 1 together with starting materials and production conditions.

Example 2

Expandable resin particles, expanded particles and an expanded molded article were obtained in the same manner as in Example 1 except that in (Impregnation with additive), 70 g of an antioxidant, a phenol-based antioxidant (produced by BASF SE, product name: IRGANOX 1010, melting point: 110° C.), was added so as to be 2000 ppm relative to the carbon black-containing polypropylene-based resin particles (seed particles), and properties thereof were evaluated.

The results are shown in Table 1 together with starting materials and production conditions.

Example 3

Expandable resin particles, expanded particles and an expanded molded article were obtained in the same manner as in Example 1 except that in (Impregnation with additive), the antioxidant was not added and 70 g of antioxidant, a phenol-based antioxidant (produced by BASF SE, product name: IRGANOX 245, melting point: 76 to 79° C.), was added during the gas impregnating step, and properties thereof were evaluated.

The results are shown in Table 1 together with starting materials and production conditions.

Example 4

(Preparation of Seed Particles)

In the same manner as in Example 1, carbon black-containing polypropylene-based resin particles (seed particles) were obtained.

(First Polymerization)

To a 100-L autoclave with a stirrer, 10.5 kg of obtained seed particles were charged, 44 kg of aqueous medium, pure water, 1.1 kg of dispersant, magnesium pyrophosphate, 10 g of surfactant to be used together with the dispersant, sodium dodecylbenzenesulfonate, were added and stirred to suspend thereof in the aqueous medium, maintained for 10 minutes and heated to 70° C. to obtain an aqueous suspension.

To the obtained suspension, 4.5 kg of styrene monomer containing 9 g of polymerization initiator, dicumyl peroxide (produced by NOF Corporation), dissolved therein was added dropwise over 60 minutes. The suspension was maintained for 60 minutes after dropwise addition to allow the seed particles to absorb the styrene monomer. Thereafter, the reaction system was heated to 120° C., maintained for 1 hour, further heated to 143° C., maintained for 2 hours, thereby polymerizing the styrene monomer in the seed particles.

(Second Polymerization)

The reaction solution from (First polymerization) was adjusted to 125° C., 61 g of surfactant, sodium dodecylbenzenesunfonate, was added and then 20 kg of styrene monomer containing 75 g of polymerization initiator, dicumyl peroxide (produced by NOF Corporation), dissolved therein was added dropwise over 4 hours, thereby conducting polymerization while allowing absorption of the styrene monomer in the seed particles. After the dropwise addition, the reaction system was maintained at 125° C. for 1.5 hours, then heated to 140° C. and maintained for 2 hours to complete polymerization to obtain about 35 kg of composite resin particles.

(Impregnation with Additive)

The obtained reaction system was adjusted to 60° C. and 1050 g of flame retardant, tris(2,3-dibromopropyl)isocyanulate (produced by Nippon Kasei Chemical Co., Ltd.), 175 g of flame retardant auxiliary agent, 2,3-dimethyl-2,3-diphenylbutane (produced by Kayaku Akzo Corporation), were added (flame retardant impregnating step), the reaction system was then heated to 140° C. and maintained for 2 hours to allow absorption of the flame retardant and the flame retardant auxiliary agent.

Thereafter, the reaction system was cooled to normal temperature and discharged from the 100-L autoclave and dehydrated and dried to obtain about 35 kg of carbon-containing composite resin particles.

(Preparation of Expandable Resin Particles)

The obtained carbon-containing composite resin particles (15 kg) and 15 g of antioxidant, a phenol-based antioxidant (produced by BASF SE, product name: IRGANOX 245, melting point: 76 to 79° C.) were charged in a pressure resistant rotary mixer having an internal capacity of 50 L and rotated, and 2.4 kg of blowing agent, butane, was injected into the pressure resistant rotary mixer (gas impregnating step). After the injection, the temperature was raised to 70° C. and stirring was continued for 4 hours. Thereafter, the temperature was cooled to normal temperature and the reaction mixture was discharged from the 50-L pressure resistant rotary mixer to obtain about 15 kg of expandable composite resin particles.

(Preparation of Expanded Particles)

The obtained expandable composite resin particles (1000 g) were then charged into a pre-expansion machine (produced by Kasahara Industry Co., Ltd., model: PSX40), heated by introducing water vapor at gauge pressure of 0.02 MPa into a vessel of the pre-expansion machine to pre-expand to a bulk expansion ratio of about 50 and obtain expanded particles.

(Preparation of Expanded Molded Article)

The obtained expanded particles were then left under normal temperature and normal pressure for 24 hours and then a cavity having an inner dimension of 300 mm×400 mm×30 mm of a mold was filled with the particles. Molding was conducted by introducing water vapor of 0.25 MPa for 40 seconds and heating, and then the mold was cooled so that the maximum surface pressure of the expanded molded article decreased to gauge pressure of 0.001 MPa, thereby obtaining the expanded molded article (expansion ratio: 51.5).

The obtained expanded molded article was used for determination of the expansion ratio, the antioxidant content and the reduction of tensile strength (80° C.×1000 hr).

The results are shown in Table 1 together with starting materials and production conditions.

Example 5

(Preparation of Seed Particles)

In the same manner as in Example 1, carbon black-containing polypropylene-based resin particles (seed particles) were obtained.

(First Polymerization)

To a 100-L autoclave with a stirrer, 17.5 kg of obtained seed particles were charged, 44 kg of aqueous medium, pure water, 1.1 kg of dispersant, magnesium pyrophosphate, 10 g of surfactant to be used together with the dispersant, sodium dodecylbenzenesulfonate, were added and stirred to suspend thereof in the aqueous medium, maintained for 10 minutes and heated to 70° C. to obtain an aqueous suspension.

To the obtained suspension, 7.5 kg of styrene monomer containing 15 g of polymerization initiator, dicumyl peroxide (produced by NOF Corporation), dissolved therein was added dropwise over 60 minutes. The suspension was maintained for 60 minutes after dropwise addition to allow the seed particles to absorb the styrene monomer. Thereafter, the reaction system was heated to 120° C., maintained for 1 hour, further heated to 143° C., maintained for 2 hours, thereby polymerizing the styrene monomer in the seed particles.

(Second Polymerization)

The reaction solution from (First polymerization) was adjusted to 125° C., 61 g of surfactant, sodium dodecylbenzenesunfonate, was added and then 10 kg of styrene monomer containing 55 g of polymerization initiator, dicumyl peroxide (produced by NOF Corporation), dissolved therein was added dropwise over 4 hours, thereby conducting polymerization while allowing absorption of the styrene monomer in the seed particles. After the dropwise addition, the reaction system was maintained at 125° C. for 1.5 hours, then heated to 140° C. and maintained for 2 hours to complete polymerization to obtain about 35 kg of composite resin particles.

(Impregnation with Additive)

The obtained reaction system was adjusted to 60° C. and 1050 g of flame retardant, tris(2,3-dibromopropyl)isocyanulate (produced by Nippon Kasei Chemical Co., Ltd.), 175 g of flame retardant auxiliary agent, 2,3-dimethyl-2,3-diphenylbutane (produced by Kayaku Akzo Corporation) were added (flame retardant impregnating step), the reaction system was then heated to 140° C. and maintained for 2 hours to allow absorption of the flame retardant and the flame retardant auxiliary agent.

Thereafter, the reaction system was cooled to normal temperature and discharged from the 100-L autoclave and dehydrated and dried to obtain about 35 kg of carbon-containing composite resin particles.

(Preparation of Expandable Resin Particles)

The obtained carbon-containing composite resin particles (15 kg) and 15 g of antioxidant, a phenol-based antioxidant (produced by BASF SE, product name: IRGANOX 245, melting point: 76 to 79° C.) were charged in a pressure resistant rotary mixer having an internal capacity of 50 L and rotated, and 2.4 kg of blowing agent, butane, was injected into the pressure resistant rotary mixer (gas impregnating step). After the injection, the temperature was raised to 70° C. and stirring was continued for 4 hours. Thereafter, the temperature was cooled to normal temperature and the reaction mixture was discharged from the 50-L pressure resistant rotary mixer to obtain about 15 kg of expandable composite resin particles.

(Preparation of Expanded Particles)

The obtained expandable composite resin particles (1000 g) were then charged into a pre-expansion machine (produced by Kasahara Industry Co., Ltd., model: PSX40), heated by introducing water vapor at gauge pressure of 0.06 MPa into a vessel of the pre-expansion machine to pre-expand to a bulk expansion ratio of about 30 and obtain expanded particles.

(Preparation of Expanded Molded Article)

The obtained expanded particles were then left under normal temperature and normal pressure for 24 hours and then a cavity having an inner dimension of 300 mm×400 mm×30 mm of a mold was filled with the particles. Molding was conducted by introducing water vapor of 0.25 MPa for 40 seconds and heating, and then the mold was cooled so that the maximum surface pressure of the expanded molded article decreased to gauge pressure 0.001 MPa, thereby obtaining the expanded molded article (expansion ratio: 30.4).

The obtained expanded molded article was used for determination of the expansion ratio, the antioxidant content and the reduction of tensile strength (80° C.×1000 hr).

The results are shown in Table 1 together with starting materials and production conditions.

Comparative Example 1

Expandable resin particles, expanded particles and an expanded molded article were obtained in the same manner as in Example 1 except that in the extrusion step in (Preparation of seed particles), the antioxidant, a phenol-based antioxidant (produced by BASF SE, product name: IRGANOX 1010, melting point: 110° C.) was added so as to be 250 ppm relative to the carbon black-containing polypropylene-based resin particles (seed particles) and the antioxidant was not added during the flame retardant impregnating step, and properties thereof were evaluated.

The results are shown in Table 1 together with starting materials and production conditions.

Comparative Example 2

Polymerization reaction was conducted in the same manner as in Example 1 except that in the extrusion step in (Preparation of seed particles), the antioxidant, a phenol-based antioxidant (produced by BASF SE, product name: IRGANOX 1010, melting point: 110° C.) was added so as to be 500 ppm relative to the carbon black-containing polypropylene-based resin particles (seed particles) and the antioxidant was not added during the flame retardant impregnating step. However, because the antioxidant inhibited the polymerization initiator during polymerization reaction, carbon-containing composite resin particles were not obtained.

The results are shown in Table 1 together with starting materials and production conditions.

Comparative Example 3

Expandable resin particles, expanded particles and an expanded molded article were obtained in the same manner as in Example 1 except that in (Impregnation with additive), 10.5 g of antioxidant, a phenol-based antioxidant (produced by BASF SE, product name: IRGANOX 1010, melting point: 110° C.) was added so as to be 300 ppm relative to the carbon black-containing polypropylene-based resin particles (seed particles), and properties thereof were evaluated.

The results are shown in Table 1 together with starting materials and production conditions.

dant-containing composite resin particles or the step of impregnating a blowing agent to obtain expandable composite resin particles, and it is believed the feature leads the above results.

Meanwhile, in Comparative Examples 1 and 2 in which an antioxidant is added during the extrusion step, resistance to thermal deterioration was not exhibited due to low amount of addition of the antioxidant in Comparative Example 1 and the antioxidant which was added at a higher amount inhibited and blocked the seeded polymerization reaction in Comparative Example 2. In Comparative Example 3 in which a lower amount of antioxidant was added, resistance to thermal deterioration exhibited was insufficient.

The invention claimed is:

1. A method for producing antioxidant-containing expandable resin particles, the method comprising:

impregnating composite resin particles with an antioxidant, a blowing agent, and optionally a flame retardant, to obtain said antioxidant-containing expandable resin particles comprising:

composite resin particles, the antioxidant, the blowing agent, and optionally a flame retardant;

said antioxidant being contained in the composite resin particles in an amount of 150 to 1500 ppm;

wherein said composite resin particles contain a polystyrene-based resin and a polypropylene-based resin, said polystyrene-based resin is contained in the composite resin particles in an amount of 100 to 400 parts by mass relative to 100 parts by mass of polypropylene-based resin, and wherein the polypropylene-based resin is abundantly present on the surface of the composite resin particles and poorly present at the center of the particles.

TABLE 1

| | | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
| Resin ratio | PP resin* | mass % | 40 | 40 | 40 | 30 | 50 | 40 | 40 | 40 |
| | PS resin* | mass % | 60 | 60 | 60 | 70 | 50 | 60 | 60 | 60 |
| Antioxidant | Addition step | — | FRIP | FRIP | GIS | GIS | GIS | ES | ES | FRIS |
| | Type** | — | AO1 | AO1 | AO2 | AO2 | AO2 | AO1 | AO1 | AO1 |
| | Added amount | ppm | 1000 | 2000 | 2000 | 1000 | 1000 | 100 | 200 | 300 |
| Polymerization | Capability of seeded polymerization | — | ○ | ○ | ○ | ○ | ○ | ○ | X Blockage | ○ |
| Composite resin particles | PP/PS ratio on particle surface | % | 67.8/32.2 | 62.6/37.4 | 64.1/35.9 | 60.4/39.6 | 51.7/48.3 | 55.6/44.4 | — | 64.0/36.0 |
| Expanded particles | Antioxidant content | ppm | 230 | 570 | 1210 | 704 | 655 | 52 | — | 140 |
| Expanded molded article | Expansion ratio | times | 39.5 | 43.1 | 42.9 | 51.5 | 30.4 | 40.7 | — | 44.0 |
| | Density | kg/m³ | 25.3 | 23.2 | 23.3 | 19.4 | 32.9 | 24.6 | — | 22.7 |
| | Antioxidant content | ppm | 140 | 470 | 1120 | 610 | 501 | 23 | — | 79 |
| | Reduction of tensile strength (80° C. × 1000 hr) | % | −14.3 | −7.6 | −5.4 | −6.5 | −8.3 | −46.9 | — | −41.4 |
| | | Evaluation*** | ○ | ○ | ○ | ○ | ○ | X | X | X |

*PP: Polypropylene PS: Styrene
**AO1: Antioxidant IRGANOX 1010 AO2: Antioxidant IRGANOX 245
***Evaluation: reduction of tensile strength: within ±25% (O), over ±25% (X)
FRIS: Flame retardant impregnating step
GIS: Gas impregnating step
ES: Extrusion step The findings indicated below are obtained from the results in Table 1:

the composite resin particles of Examples 1 to 5 have higher ratios of polypropylene-based resin on the particle surface compared to the composite resin particles of Comparative Examples 1 to 3;

the expanded particles of Examples 1 to 5 contain higher amounts of antioxidant than the expanded particles of Comparative Examples 1 to 3; and the expanded molded articles of Examples 1 to 5 contain higher amounts of antioxidant and have lower reduction of tensile strength, and thus have better resistance to thermal deterioration than the expanded molded articles of Comparative Examples 1 to 3.

In Examples 1 to 5, an antioxidant is added in the step of impregnating with a flame retardant to obtain flame retar- 2. The method for producing the antioxidant-containing expandable resin particles according to claim 1, the method comprising:

obtaining composite resin particles by repeating, at least twice, impregnating seed particles of the polypropylene-based resin with a monomer for the polystyrene-based resin and polymerizing the same, wherein the polymerizing has a polymerization temperature for a first polymerization of (T−10)° C. to (T+20)° C. and for a second polymerization of (T−25)° C. to (T+10)° C., provided that T° C. is a melting point of the polypropylene-based resin.

3. The method for producing the antioxidant-containing expandable resin particles according to claim 1, wherein the flame retardant and the antioxidant are added to an aqueous medium containing the composite resin particles dispersed therein, and the composite resin particles are impregnated with the flame retardant and the antioxidant while maintaining the mixture at 120 to 150° C. for 1 to 3 hours.

4. Antioxidant-containing expandable resin particles obtained by a method comprising:

impregnating composite resin particles with an antioxidant, a blowing agent, and optionally a flame retardant, to obtain said antioxidant-containing expandable resin particles comprising composite resin particles, the antioxidant, the blowing agent, and optionally a flame retardant;

said antioxidant being contained in the composite resin particles in an amount of 150 to 1500 ppm;

wherein said composite resin particles contain a polystyrene-based resin and a polypropylene-based resin, said polystyrene-based resin is contained in the composite resin particles in an amount of 100 to 400 parts by mass relative to 100 parts by mass of polypropylene-based resin, and wherein the polypropylene-based resin is abundantly present on the surface of the composite resin particles and poorly present at the center of the particles.

5. The antioxidant-containing expandable resin particles according to claim 4, wherein a content of the polystyrene-based resin relative to 100 parts by mass of the polypropylene-based resin is 150 to 300 parts by mass.

6. The antioxidant-containing expandable resin particles according to claim 4, wherein the polypropylene-based resin is present on the surface of the composite resin particles at 51 to 85% and the polystyrene-based resin is present on the surface of the composite resin particles at 15 to 49%.

7. The antioxidant-containing expandable resin particles according to claim 4, wherein the composite resin particles contain 200 to 1400 ppm of antioxidant.

8. Expanded particles obtained by expanding the antioxidant-containing expandable resin particles according to claim 4, the expanded particles containing 100 to 1500 ppm of antioxidant.

9. An expanded molded article obtained by expansion-molding the expanded particles according to claim 8, the expanded molded article containing 100 to 1500 ppm of antioxidant.

* * * * *